Feb. 20, 1968 B. F. HOFFMAN ET AL 3,370,247
HARMONIC NOTCH FILTER
Filed July 24, 1964

PHASE AND GAIN VERSUS FREQUENCY

BENJAMIN F. HOFFMAN
RONALD W. CARRUTHERS SR
INVENTORS

BY
Claude Funkhouser
ATTORNEY

United States Patent Office 3,370,247

Patented Feb. 20, 1968

3,370,247
HARMONIC NOTCH FILTER

Benjamin F. Hoffman, Hyattsville, and Ronald W. Carruthers, Sr., Baltimore, Md., assignors to the United States of America as represented by the Secretary of the Navy Filed July 24, 1964, Ser. No. 385,560
9 Claims. (Cl. 330—109)

The instant invention relates generally to active twin T notch filters and more specifically to an improved harmonic notch filter.

Recent developments in the guided missile art have been hampered by many difficulties quite sophisticated in nature. One of the more serious difficulties has been the presence of undesired harmonics in the control signal carrier.

In the Typhon LR missile the sensing instrument outputs take the form of 400 c.p.s. suppressed carrier signals. These signals are amplified and synchronously demodulated to yield low frequency intelligence signals. A strong hecond harmonic of the nominally 400 c.p.s. carrier signal as well as weaker, higher order harmonics are also present at the demodulator outputs. Some missile autopilot channels require special filtering of these carrier remnants.

Generally the following restrictions are placed on the required harmonic notch filter:

(1) Autopilot loop stability demands that very little phase lag be introduced by the harmonic notch filter at low frequencies.

(2) Operational demodulators, such as those in the Typhon LR missile, require reasonably large resistive loads for optimum performance. The harmonic notch filter, which is fed directly by an operational demodulator, should have a high input impedance with very little reactive component for frequencies greater than the notch frequency.

(3) Carrier frequencies generally have a tolerance, e.g., a ±5% tolerance around the nominal frequency. The harmonic notch filter must provide adequate filtering to accommodate any possible carrier frequency.

It is an object of this invention to provide a harmonic notch filter for filtering out undesired harmonics from demodulated suppressed carrier control signals.

Another object of this invention is to provide, in a harmonic notch filter, means for filtering out undesired harmonics from demodulated suppressed carrier control signals while introducing very little phase lag at low frequencies.

Still another object of this invention is to provide a harmonic notch filter having a high input impedance at frequencies above the notch frequency.

It is a further object of this invention to provide a harmonic notch filter having a high input impedance at frequencies above the notch frequency, and having very little reactive component at said frequencies.

A still further object of this invention is to provide a harmonic notch filter capable of filtering out harmonics from carrier control signals, and having the ability to accommodate possible variations in carrier control signal frequency.

The attendant advantages of this invention will be better appreciated and said invention will become more clearly understood by reference to the following detailed description and accompanying drawings illustrating one embodiment of the instant invention, wherein.

Figure 1:
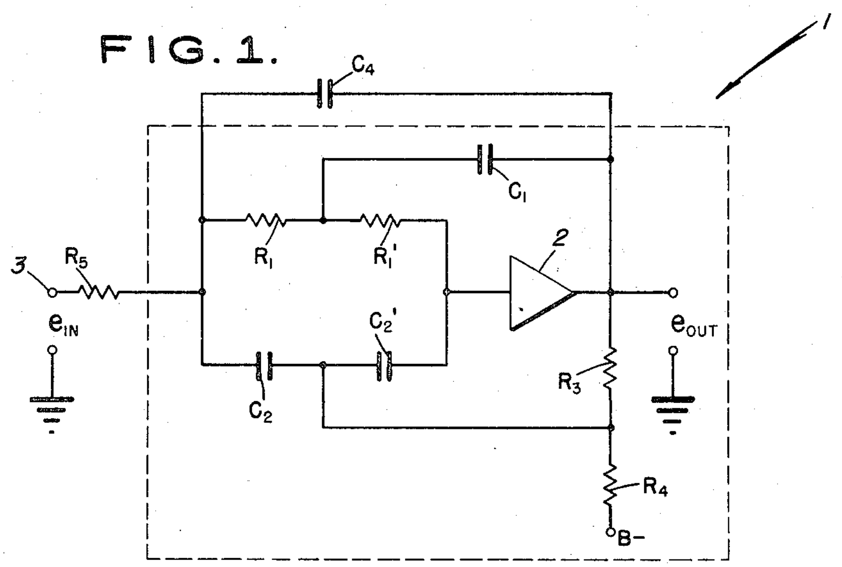
FIG. 1 is a schematic diagram of the instant invention.

Referring to the drawings in more detail, and more specifically to FIG. 1, a twin T notch filter, such as revealed in a copending application by Benjamin F. Hoffman et al. for a Variable Feedback Notch Filter, Ser. No. 385,559, filed on the same day as the present application, is shown at 1, comprising a unity gain transistor amplifier 2, capacitors $C_1$, $C_2$, and $C_2'$, and resistors $R_1$, $R_1'$, $R_3$, and $R_4$.

The harmonic notch filter shown in FIG. 1 is actually a modification of the copending application mentioned hereinabove. This modification includes an additional feedback path consisting of a capacitor $C_4$ connected in electrical parallelism with the variable feedback notch filter shown at 1, and an input resistor $R_3$ connected in electrical series relationship with input terminal 3 and the twin T notch filter shown at 1. Additionally the resistor $R_4$ is connected to a negative bias potential rather than to ground, and the series capacitors $C_3$ and $C_4$ are eliminated and replaced by a single capacitor $C_1$ which is connected between the output terminal 3 and the junction of the resistors $R_1$ and $R_1'$.

The theoretical voltage transfer function $e_{out}/e_{in}$, for the harmonic notch filter shown in FIG. 1, will now be derived, based on the following assumptions:

(1) Zero source impedance
(2) Zero amplifier output impedance
(3) Infinite amplifier input impedance
(4) An amplifier forward gain of unity.

Subject to the assumptions mentioned hereinabove, and the conditions that $$R_1=R_1'=4\frac{R_3R_4}{R_3+R_4},\ \text{and}\ C_2=C_2'=C_1$$

the theoretical voltage transfer function, $e_o(s)/e_{in}(s)$, and the filter input impedance, $Z_{in}(s)$ are as follows:

$$e_o(s)/e_{in}(s)=\frac{\tau_0^2s^2+1}{\tau_1^2s^2+2\phi\tau_1s+1}$$

$$Z_{in}(s)=\frac{\tau_1^2s^2+2\phi\tau_1s+1}{\sqrt{2}\zeta C_1s[\tau_2s+1]}$$

where the following notation is used:

$$\tau_0=\frac{1}{\text{Notch frequency}}=\frac{R_1C_1}{\sqrt{2}}$$

$\zeta$=damping factor of variable feedback $$\text{notch filter}=\frac{\sqrt{2}R_3}{R_3+R_4}$$

$$\tau_2=\sqrt{2}\tau_0 1+\frac{C_4}{C_1}$$

$$\tau_1^2=\tau_0^2+2\zeta\tau_0R_5(C_1+C_4)$$

$$\phi=\zeta/\tau_1\left(\tau_0+\frac{R_4C_1}{\sqrt{2}}\right)$$

Typical values for some of the parameters mentioned hereinabove are as follows:

$\tau_0=0.199\times10^{-3}$ seconds
$\tau_1=1.048\times10^{-3}$ seconds
$\tau_2=2.23\times10^{-3}$ seconds
$\zeta=0.494$
$\phi=0.321$ It is to be noted at this point that for signal frequencies above the notch frequency, the harmonic notch filter input impedance has a real part of the order of magnitude of the resistor $R_5$.

Figure 2:
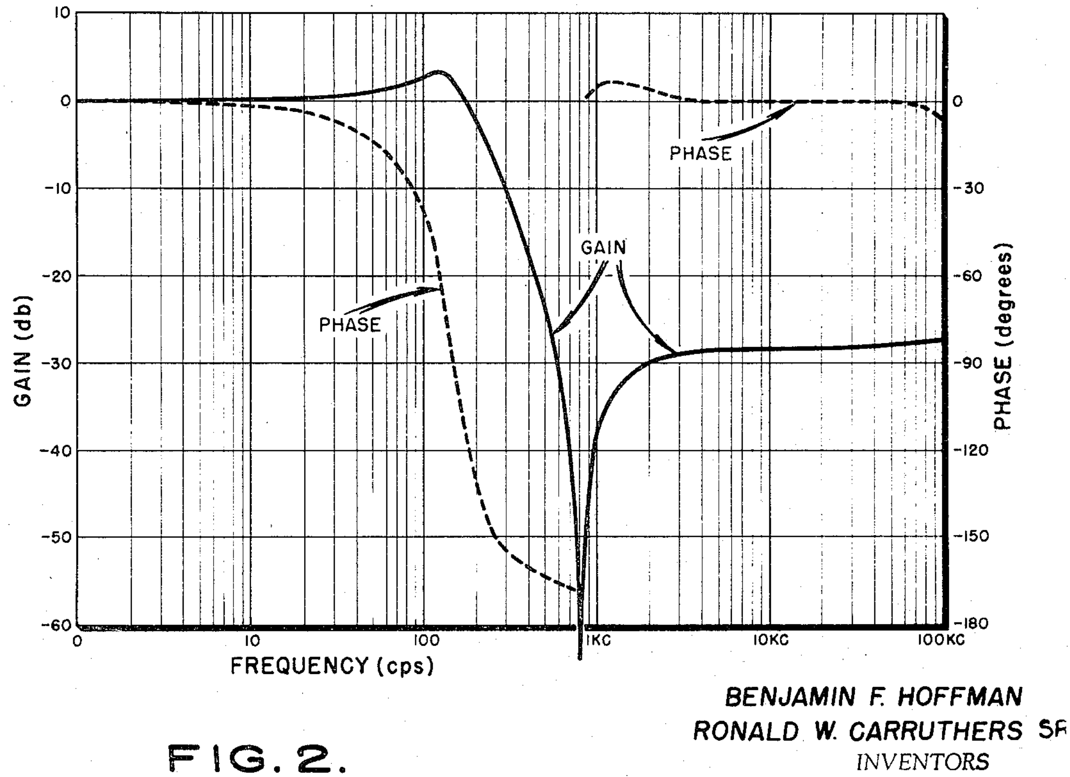
FIG. 2 is a semi-logarithmic plot of response versus frequency as observed experimentally.

Referring now to FIG. 2, an experimental plot of gain and phase versus frequency is shown for frequendies of 0 c.p.s. through 100 kilocycles/sec. The abovementioned plots were acquired by experimenting with an 800 c.p.s. harmonic notch filter constructed in accordance with the above teachings. A perusal of the curves will reveal a very sharp notch, in the plot of gain versus frequency, at a frequency of 800 c.p.s. In the relatively low frequency range of 1 kilocycle/sec. through 100 kilocycles/sec. the plot of phase versus frequency is nearly a straight line in the region of zero phase shift. It is therefore obvious that the instant invention admirably succeeds in filtering out the undesired harmonics while introducing very little low frequency phase shift.

It can readily be seen that many variations and modifications of the present invention are possible in the light of the aforementioned teachings, and it will be apparent to those skilled in the art that various changes in form and arrangement of components may be made to suit requirements without departing from the spirit and scope of the invention. It is therefore to be understood that within the scope of the appended claims the instant invention may be practiced in a manner otherwise than is specifically described herein.

What is claimed is:

1. The combination in a harmonic notch filter for filtering out undesired harmonics from suppressed carrier control signals, comprising a twin T notch filter having a resistive portion and a reactive portion, a unity gain amplifier connected to the output of said twin T notch filter, a resistor connected to the input of said twin T notch filter for providing a relatively high input impedance at frequencies above the notch frequency, a first capacitor connected to the output of said amplifier and to the resistive portion of said twin T notch filter, a first resistor connected to the output of said amplifier, a second resistor connected in series with said first resistor, means for providing a conductive path between the junction of said first and second resistors, and the reactive portion of said twin T notch filter, a ground line for providing an electrical ground at the input and output of said harmonic notch filter, and a second capacitor connected between the input of said twin T notch filter and the output of said amplifier, whereby said harmonic notch filter will introduce very little phase lag to input signals at low frequencies.

2. The combination, in a harmonic notch filter for filtering out undesired harmonics from suppressed carrier control signals while introducing very little phase lag at low frequencies and having very little reactive component at frequencies above the notch frequency, including a first resistor, a second resistor connected in series with said first resistor, a first capacitor, a second capacitor connected in series with said first capacitor, said first and second capacitors being connected in electrical parallelism with said first and second resistors, a ground line for providing an electrical ground at the input and output of said harmonic notch filter, a unity gain amplifier connected to said second resistor and said second capacitor, a third resistor connected to the output of said amplifier, a fourth resistor connected in electrical series with said third resistor, means for providing a conductive path from the junction of said third and fourth resistors to the junction of said first and second capacitors, a third capacitor connected to the junction of said first and second resistors and to the output of said amplifier, a fourth capacitor connected to the input of said first resistor and to the output of said amplifier, and a fifth resistor connected to the inputs of said first resistor and said first capacitor for providing a relatively high input impedance at frequencies above the notch frequency of said filter.

3. A harmonic notch filter, including a twin T notch filter having a resistive portion and a reactive portion, a unity gain amplifier connected to the output of said twin T notch filter, means connected to the input of said twin T notch filter for providing a relatively high input impedance at frequencies above the notch frequency of said filter, first feedback means connected to the output of said amplifier for feeding back signals to the resistive portion of said twin T notch filter, second feedback means connected to the output of said amplifier for feeding back signals to the input of said twin T notch filter, and third feedback means connected to the output of said amplifier for feeding back signals to the reactive portion of said twin T notch filter whereby undesired harmonics will be filtered out from demodulated suppressed carrier control signals fed to said harmonic notch filter with very little introduction of phase lag at low frequencies.

4. The invention as set forth in claim 3, wherein said first feedback means is reactive, said second feedback means is reactive, and said third feedback means is resistive.

5. The invention as set forth in claim 3, wherein said first feedback means comprises a capacitor, said second feedback means comprises a capacitor, and said third feedback means comprises a pair of series connected resistors.

6. The invention as recited in claim 5, wherein the resistive portion of said twin T notch filter comprises a pair of series connected resistors, said first feedback capacitor being connected to the junction of said series connected resistors, and the reactive portion of said twin T notch filter comprises a pair of series connected capacitors, said feedback resistors having their junction connected to the junction of said series connected capacitors.

7. The invention as set forth in claim 3, wherein the resistive portion of said twin T notch filter comprises a pair of series connected resistors, and the reactive portion of said twin T notch filter comprises a pair of series connected capacitors.

8. The combination, in a harmonic notch filter for filtering out undesired harmonics from suppressed carrier control signals, comprising a twin T notch filter having a resistive portion and a reactive portion, a unity gain amplifier connected to the output of said twin T notch filter, reactive means for feeding a signal from the output of said amplifier back to the resistive portion of said twin T notch filter, resistive means for feeding a signal from the output of said amplifier back to the reactive portion of said twin T notch filter, and second reactive means for feeding back signals from the output of said amplifier to the input of said twin T notch filter, whereby said harmonic notch filter will have a transfer function approximating $$e_0(s)/e_{in}(s)=\frac{\tau_0^2s^2+1}{\tau_1^2s^2+2\phi\tau_1s+1}$$

9. In a harmonic notch filter having a transfer function approximating $$e_0(s)/e_{in}(s)=\frac{\tau_0^2s^2+1}{\tau_1^2s^2+2\phi\tau_1s+1}$$

and an input impedance approximating $$Z_{in}(s)=\frac{\tau_1^2s^2+2\phi\tau_1s+1}{\sqrt{2}\zeta C_1s[\tau_2s+1]}$$

the combination including a twin T notch filter having a resistive portion and a reactive portion, a unity gain amplifier connected to the output of said twin T notch filter, means connected to the input of said twin T notch filter for providing a relatively high input impedance at frequencies above the notch frequency of said filter, first feedback means connected to the output of said amplifier for feeding back signals to the resistive portion of said twin T notch filter, second feedback means connected to the output of said amplifier for feeding back signals to the input of said twin T notch filter, and third feedback means connected to the output of said amplifier for feeding back signals to the reactive portion of said twin T notch filter whereby undesired harmonics will be filtered out from demodulated suppressed carrier control signals fed to said harmonic notch filter with very little introduction of phase lag at low frequencies.

References Cited

UNITED STATES PATENTS

| | | | |
|---|---|---|---|
| 2,441,567 | 5/1948 | Darlington | 330—109 X |
| 2,987,678 | 6/1961 | Miller et al. | 330—109 |

ROY LAKE, *Primary Examiner.*

NATHAN KAUFMAN, *Examiner.*